United States Patent
Fraser et al.

(10) Patent No.: US 11,583,004 B2
(45) Date of Patent: Feb. 21, 2023

(54) VAPOR PROVISION DEVICE WITH LIQUID CAPTURE

(71) Applicant: NICOVENTURES TRADING LIMITED, London (GB)

(72) Inventors: Rory Fraser, London (GB); Howard Rothwell, London (GB); Jeremy Wright, London (GB)

(73) Assignee: Nicoventures Trading Limited, London (GB)

( * ) Notice: Subject to any disclaimer, the term of this patent is extended or adjusted under 35 U.S.C. 154(b) by 514 days.

(21) Appl. No.: 16/489,147

(22) PCT Filed: Feb. 27, 2018

(86) PCT No.: PCT/GB2018/050505
§ 371 (c)(1),
(2) Date: Aug. 27, 2019

(87) PCT Pub. No.: WO2018/158566
PCT Pub. Date: Sep. 7, 2018

(65) Prior Publication Data
US 2020/0000151 A1    Jan. 2, 2020

(30) Foreign Application Priority Data

Mar. 1, 2017 (GB) ..................... 1703284

(51) Int. Cl.
*A24F 40/44*    (2020.01)
*B01D 53/04*    (2006.01)
(Continued)

(52) U.S. Cl.
CPC ............. *A24F 40/44* (2020.01); *A24F 40/40* (2020.01); *B01D 53/0407* (2013.01); *H05B 3/44* (2013.01);
(Continued)

(58) Field of Classification Search
CPC .......... A24F 40/10; A24F 40/40; A24F 40/44; B01D 2253/10; B01D 2253/20;
(Continued)

(56) References Cited

U.S. PATENT DOCUMENTS 9,980,515 B2 * 5/2018 Milin ..................... A24F 40/40
11,291,783 B2   4/2022 Fraser
(Continued)

FOREIGN PATENT DOCUMENTS

CN    103948174    7/2014
EA    026076 B1    2/2017
(Continued)

OTHER PUBLICATIONS

International Search Report and Written Opinion, Application No. PCT/GB2018/050505, dated May 11, 2018, 13 pages.
(Continued)

*Primary Examiner* — Christopher P Jones
(74) *Attorney, Agent, or Firm* — Patterson Thuente, P.A.

(57) ABSTRACT

An assembly for a vapor provision device includes a vapor generator for vaporizing source liquid, a liquid conduit for delivering source liquid from a reservoir to the vapor generator, and a liquid capture element in liquid transfer contact with at least a portion of the liquid conduit between the vapor generator and a part of the liquid conduit that receives liquid from the reservoir, and including an absorbent structure providing a lower capillary force than a capillary force of the liquid conduit.

21 Claims, 2 Drawing Sheets

(51) Int. Cl.
  *H05B 3/44* (2006.01)
  *A24F 40/40* (2020.01)
  *A24F 40/10* (2020.01)

(52) U.S. Cl.
  CPC .......... *A24F 40/10* (2020.01); *B01D 2253/10* (2013.01); *B01D 2253/20* (2013.01); *H05B 2203/014* (2013.01); *H05B 2203/021* (2013.01)

(58) Field of Classification Search
  CPC .......... B01D 53/0407; H05B 2203/014; H05B 2203/021; H05B 3/44
  See application file for complete search history.

(56) References Cited

U.S. PATENT DOCUMENTS

| | | | |
|---|---|---|---|
| 2012/0145169 | A1 | 6/2012 | Wu |
| 2015/0201674 | A1 | 7/2015 | Dooly |
| 2015/0245667 | A1 | 9/2015 | Memari |
| 2015/0245668 | A1* | 9/2015 | Memari ............... H05K 999/99 206/250 |
| 2015/0342256 | A1 | 12/2015 | Chen |
| 2016/0000147 | A1 | 1/2016 | Li |
| 2016/0073692 | A1 | 3/2016 | Alarcon |
| 2016/0106155 | A1 | 4/2016 | Reevell |
| 2018/0077967 | A1* | 3/2018 | Hatton ................... A24F 40/40 |
| 2018/0199627 | A1* | 7/2018 | Bowen ................... A24D 3/17 |
| 2019/0124982 | A1* | 5/2019 | Atkins ................... A24F 40/30 |
| 2019/0373679 | A1* | 12/2019 | Fu ........................... G08B 6/00 |
| 2020/0085099 | A1* | 3/2020 | Soriano ................. A24F 40/50 |
| 2020/0376210 | A1* | 12/2020 | Simpson ................ A24F 40/42 |
| 2020/0378681 | A1* | 12/2020 | Du ........................ B01J 20/3458 |
| 2021/0274846 | A1* | 9/2021 | Potter ..................... A24F 40/51 |
| 2021/0337875 | A1* | 11/2021 | Wright .................. A24F 40/485 |
| 2022/0142257 | A1* | 5/2022 | Austin ................... A24F 40/44 |
| 2022/0142404 | A1* | 5/2022 | Conrad ................. F24C 15/327 |

FOREIGN PATENT DOCUMENTS

| | | |
|---|---|---|
| JP | 2015500025 A | 1/2015 |
| JP | 2015052459 A | 3/2015 |
| JP | 2015524258 A | 8/2015 |
| JP | 2015524259 A | 8/2015 |
| KR | 100955080 B1 | 4/2010 |
| KR | 20140135774 A | 11/2014 |
| KR | 20150030733 A | 3/2015 |
| WO | WO2014012906 | 1/2014 |
| WO | WO2014177859 | 11/2014 |
| WO | WO2015077645 | 5/2015 |
| WO | WO-2016108694 A1 | 7/2016 |
| WO | WO2016123764 | 8/2016 |
| WO | WO2017028295 | 2/2017 |

OTHER PUBLICATIONS

Decision to Grant dated May 26, 2020 for Russian Application No. 2019127068, 11 pages.
International Preliminary Report on Patentability for Application No. PCT/GB2018/050505, dated Sep. 12, 2019, 7 pages.
Notice of Allowance dated Nov. 4, 2020 for Japanese Application No. 2019-545301, 5 pages.
Office Action For Korean Application No. 10-2019-7025289, dated Jul. 27, 2021, 3 pages.

* cited by examiner

VAPOR PROVISION DEVICE WITH LIQUID CAPTURE

PRIORITY CLAIM

The present application is a National Phase entry of PCT Application No. PCT/GB2018/050505, filed Feb. 27, 2018, which claims priority from GB Patent Application No. 1703284.8, filed Mar. 1, 2017, which is hereby fully incorporated herein by reference.

TECHNICAL FIELD

The present disclosure relates to vapor provision devices such as electronic vapor provision devices, and assemblies for vapor provision devices such as electronic vapor provision devices.

BACKGROUND

Aerosol or vapor provision devices and systems such as e-cigarettes generally comprise a reservoir of a source liquid containing a formulation, typically including nicotine, from which an aerosol is generated, such as through vaporization or other means. Thus an aerosol source for a vapor provision system may comprise a heating element or other vapor generating component coupled to a portion of the source liquid from the reservoir. In some systems, the heating element and reservoir are comprised within a first section or component which is connectable to a second section or component housing a battery to provide electrical power to the heating element. This first section may be referred to as a cartomizer, and can be disposable to be replaced when the source liquid has been consumed. In use, a user inhales on the device to activate the heating element which vaporizes a small amount of the source liquid, which is thus converted to an aerosol for inhalation by the user.

The reservoir may hold free-flowing source liquid or may house some absorbent material which is soaked in source liquid. The reservoir is designed so that the source liquid can exit the reservoir, reach the heating element and be vaporized when the heating element is at a high temperature; this may be by use of a conduit such as a porous wicking element which reaches into the reservoir and is physically coupled to the heating element. While the reservoir and conduit are constructed to contain the source liquid and deliver it for vaporization at an appropriate rate, this arrangement can be very sensitive to pressure differentials between the reservoir interior and the external environment. An increase in pressure inside the tank relative to the environment can force liquid out of the reservoir until sufficient liquid is lost to re-establish a pressure balance. The escaped liquid may be too much for the conduit and heater to successfully hold or vaporize, and so may leak into the interior of the device, potentially causing damage and ultimately leakage from the device itself, and also loss of liquid that could otherwise be consumed.

Approaches aimed at mitigating these problems are of interest.

SUMMARY

According to a first aspect of certain embodiments described herein, there is provided an assembly for a vapor provision device comprising: a vapor generator for vaporizing source liquid; a liquid conduit for delivering source liquid from a reservoir to the vapor generator; and a liquid capture element in liquid transfer contact with at least a portion of the liquid conduit between the vapor generator and a part of the liquid conduit that receives liquid from the reservoir, and comprising an absorbent structure providing a lower capillary force than a capillary force of the liquid conduit.

According to a second aspect of certain embodiments described herein, there is provided a cartridge assembly for a vapor provision device comprising an assembly according to the first aspect, and a reservoir for holding source liquid.

According to a third aspect of certain embodiments described herein, there is provided a vapor provision device comprising an assembly according to the first aspect or a cartridge assembly according to the second aspect.

According to a fourth aspect of certain embodiments, there is provided an atomizer assembly for an electronic vapor provision device comprising: a vaporizer for vaporizing source liquid; a liquid delivery mechanism for delivering source liquid from a reservoir to the vaporizer; and an absorbent buffer element contacting the liquid delivery mechanism between an outlet of the reservoir and the vaporizer and being less hydrophilic to the source liquid than the liquid delivery mechanism.

According to a fifth aspect of certain embodiments, there is provided a method for capturing source liquid that has leaked from a reservoir in a vapor provision device, the method comprising: arranging a liquid capture element in liquid transfer contact with at least a portion of a liquid conduit configured to deliver source liquid from a reservoir to a vapor generator, the portion lying between the vapor generator and a part of the liquid conduit that receives liquid from the reservoir, wherein the liquid capture element comprises an absorbent structure providing a lower capillary force than a capillary force of the liquid conduit.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, an electronic vapor provision device or a component for an electronic vapor provision device may be provided in accordance with approaches described herein which includes any one or more of the various features described below as appropriate.

BRIEF DESCRIPTION OF THE DRAWINGS

Various embodiments will now be described in detail by way of example only with reference to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to (but is not limited to) electronic aerosol or vapor provision systems, such as e-cigarettes. Throughout the following description the terms "e-cigarette" and "electronic cigarette" may sometimes be used; however, it will be appreciated these terms may be used interchangeably with aerosol (vapor) provision system or device. Similarly, "aerosol" may be used interchangeably with "vapor".

As used herein, the term "component" is used to refer to a part, section, unit, module, assembly or similar of an electronic cigarette that incorporates several smaller parts or elements, often within an exterior housing or wall. An electronic cigarette may be formed or built from one or more such components, and the components may be removably connectable to one another, or may be permanently joined together during manufacture to define the whole electronic cigarette.

According to some embodiments of the disclosure, it is proposed to provide an electronic cigarette with a liquid buffer system that can receive (capture) and store excess liquid, for example arising from a relative overpressure in a liquid reservoir that forces more liquid out of the reservoir than can be held in a wicking element or be vaporized. An absorbent buffer element is arranged in contact with the liquid system that delivers liquid from the reservoir to a vapor generating element, but is configured such that under normal operation it will not absorb liquid, yet is available to absorb excess liquid that might otherwise leak into the interior of the electronic cigarette. If the reservoir becomes empty, any liquid held in the buffer element may then be supplied for vaporization. Hence, escaped liquid need not be wasted, and is less likely to leak into the device interior or out from the electronic cigarette. In effect, leaked liquid is retained within a storage system separate from the reservoir as usable liquid following some leakage failure modes. Loss of consumable liquid is therefore reduced, and external leaks are reduced, giving increased user convenience.

Figure 1:
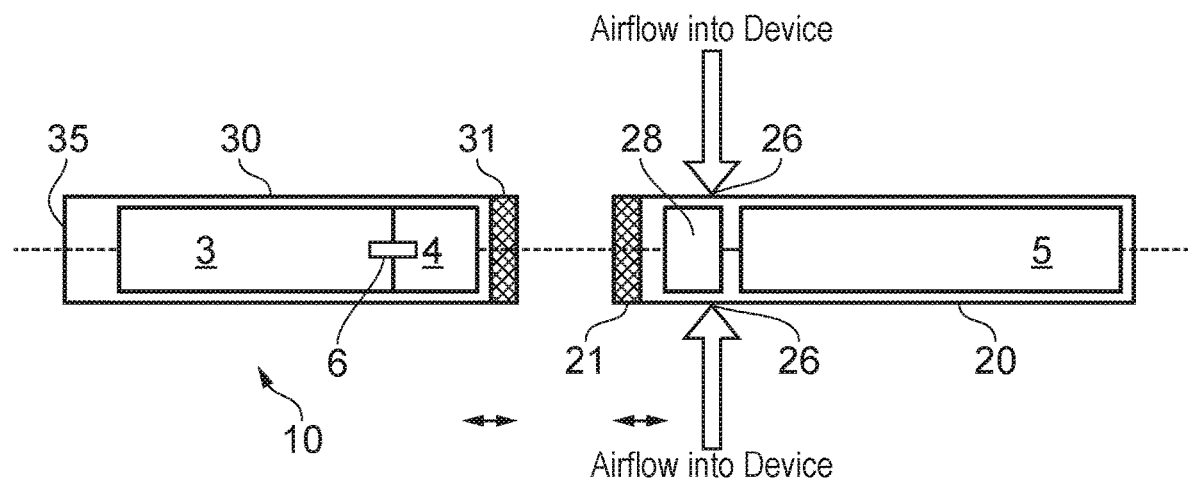
FIG. 1 shows a simplified schematic cross-sectional view of an example electronic cigarette or vapor provision device.

FIG. 1 is a highly schematic diagram (not to scale) of an example aerosol/vapor provision system such as an e-cigarette 10. The e-cigarette 10 has a generally cylindrical shape, extending along a longitudinal axis indicated by a dashed line, and comprises two main components, namely a control or power component or section 20 and a cartridge assembly or section 30 (sometimes referred to as a cartomizer, clearomizer or atomizer) that operates as a vapor generating component.

The cartridge assembly 30 includes a reservoir 3 containing a source liquid comprising a liquid formulation from which an aerosol is to be generated, for example containing nicotine. As an example, the source liquid may comprise around 1 to 3% nicotine and 50% glycerol, with the remainder comprising roughly equal measures of water and propylene glycol, and possibly also comprising other components, such as flavorings. The reservoir 3 has the form of a storage tank, being a container or receptacle in which source liquid can be stored such that the liquid is free to move and flow within the confines of the tank. Alternatively, the reservoir 3 may contain a quantity of absorbent material such as cotton wadding or glass fiber which holds the source liquid within a porous structure. The reservoir 3 may be sealed after filling during manufacture so as to be disposable after the source liquid is consumed, or may have an inlet port or other opening through which new source liquid can be added. The cartridge assembly 30 also comprises an electrical heating element or heater 4 located externally of the reservoir tank 3 for generating the aerosol by vaporization of the source liquid by heating. A liquid conduit arrangement such as a wick or other porous element 6 may be provided to deliver source liquid from the reservoir 3 to the heater 4. The wick 6 has one or more parts located inside the reservoir 3 so as to be able to absorb source liquid and transfer it by wicking or capillary action to other parts of the wick 6 that are in contact with the heater 4. This liquid is thereby heated and vaporized, to be replaced by new source liquid transferred to the heater 4 by the wick 6. The wick therefore extends through a wall that defines the interior volume of the reservoir tank 3, and might be thought of as a bridge, path or conduit between the reservoir 3 and the heater 4 that delivers or transfers liquid from the reservoir to the heater. Terms including conduit, liquid conduit, liquid transfer path, liquid delivery path, liquid transfer mechanism, and liquid delivery mechanism may all be used interchangeably herein to refer to a wick or corresponding component or structure.

A heater and wick (or similar) combination is sometimes referred to as an atomizer or atomizer assembly, and the reservoir with its source liquid plus the atomizer may be collectively referred to as an aerosol source. Other terminology may include a liquid delivery assembly, a liquid transfer assembly, or simply assembly, where in the present context these terms may be used interchangeably to refer to a vapor generating element (vapor generator) and a wicking or similar component or structure (liquid conduit) that delivers or transfer liquid from a reservoir to the vapor generator. Various designs are possible, in which the parts may be differently arranged compared to the highly schematic representation of FIG. 1. For example, the wick 6 may be an entirely separate element from the heater 4, or the heater 4 may be configured to be porous and able to perform the wicking function directly (a metallic mesh, for example). Alternatively, the liquid conduit may be formed from one or more slots, tubes or channels between the reservoir and the heater which are narrow enough to support capillary action to draw source liquid out of the reservoir and deliver it for vaporization. Other means for vapor generation may be used in place of a heater, such a vibrating vaporizer based on the piezoelectric effect, for example. In an electrical or electronic device, the vapor generator may be an electrical heating element that operates by ohmic (Joule) heating or by inductive heating. Also, the device may a non-electrical device, that operates by pump-action, for example. In general, therefore, an atomizer can be considered to be a vapor generating or vaporizing element able to generate vapor from source liquid delivered to it, and a liquid conduit able to deliver or transport liquid from a reservoir or similar liquid store to the vapor generator by a capillary force. Embodiments of the disclosure are applicable to all and any such assembly configurations. Regardless of the implementation, the parts will be configured to form a liquid flow path by which the source liquid is able to travel from the interior of the reservoir 3 to the vicinity and surface of the heater 4 (or other vapor generator) for vaporization. This is the intended fluid path, whereby liquid is delivered to the heater and should be successfully vaporized and thereby prevented from arriving at any unwanted location elsewhere within the electronic cigarette. This operation is based on a delivery of source liquid at an expected rate such that the vapor generator can handles the incoming liquid. However, in the event of a leakage such as may be caused by excess pressure inside the reservoir, or even under normal pressure conditions when the vapor generator is not operating, too much liquid may accumulate in or at the conduit and the vapor generator and drip away to escape as free liquid in a chamber housing the atomizer.

Returning to FIG. 1, the cartridge assembly 30 also includes a mouthpiece 35 having an opening or air outlet through which a user may inhale the aerosol generated by the heater 4.

The power component 20 includes a cell or battery 5 (referred to herein after as a battery, and which may be re-chargeable) to provide power for electrical components of the e-cigarette 10, in particular the heater 4. Additionally, there is a printed circuit board 28 and/or other electronics or circuitry for generally controlling the e-cigarette. The control electronics/circuitry connect the heater 4 to the battery 5 when vapor is required, for example in response to a signal from an air pressure sensor or air flow sensor (not shown) that detects an inhalation on the system 10 during which air enters through one or more air inlets 26 in the wall of the power component 20. When the heating element 4 receives power from the battery 5, the heating element 4 vaporizes source liquid delivered from the reservoir 3 by the wick 6 to generate the aerosol, and this is then inhaled by a user through the opening in the mouthpiece 35. The aerosol is carried from the aerosol source to the mouthpiece 35 along an air channel (not shown) that connects the air inlet 26 to the aerosol source to the air outlet when a user inhales on the mouthpiece 35. An air flow path through the electronic cigarette is hence defined, between the air inlet(s) (which may or may not be in the power component) to the atomizer and on to the air outlet at the mouthpiece. In use, the air flow direction along this air flow path is from the air inlet to the air outlet, so that the atomizer can be described as lying downstream of the air inlet and upstream of the air outlet.

In this particular example, the power section 20 and the cartridge assembly 30 are separate parts detachable from one another by separation in a direction parallel to the longitudinal axis, as indicated by the solid arrows in FIG. 1. The components 20, 30 are joined together when the device 10 is in use by cooperating engagement elements 21, 31 (for example, a screw or bayonet fitting) which provide mechanical and electrical connectivity between the power section 20 and the cartridge assembly 30. This is merely an example arrangement, however, and the various components may be differently distributed between the power section 20 and the cartridge assembly section 30, and other components and elements may be included. The two sections may connect together end-to-end in a longitudinal configuration as in FIG. 1, or in a different configuration such as a parallel, side-by-side arrangement. The system may or may not be generally cylindrical and/or have a generally longitudinal shape. Either or both sections may be intended to be disposed of and replaced when exhausted (the reservoir is empty or the battery is flat, for example), or be intended for multiple uses enabled by actions such as refilling the reservoir and recharging the battery. Alternatively, the e-cigarette 10 may be a unitary device (disposable or refillable/rechargeable) that cannot be separated into two parts, in which case all components are comprised within a single body or housing. Embodiments and examples of the present disclosure are applicable to any of these configurations and other configurations of which the skilled person will be aware.

Figures 2, 3, 4:
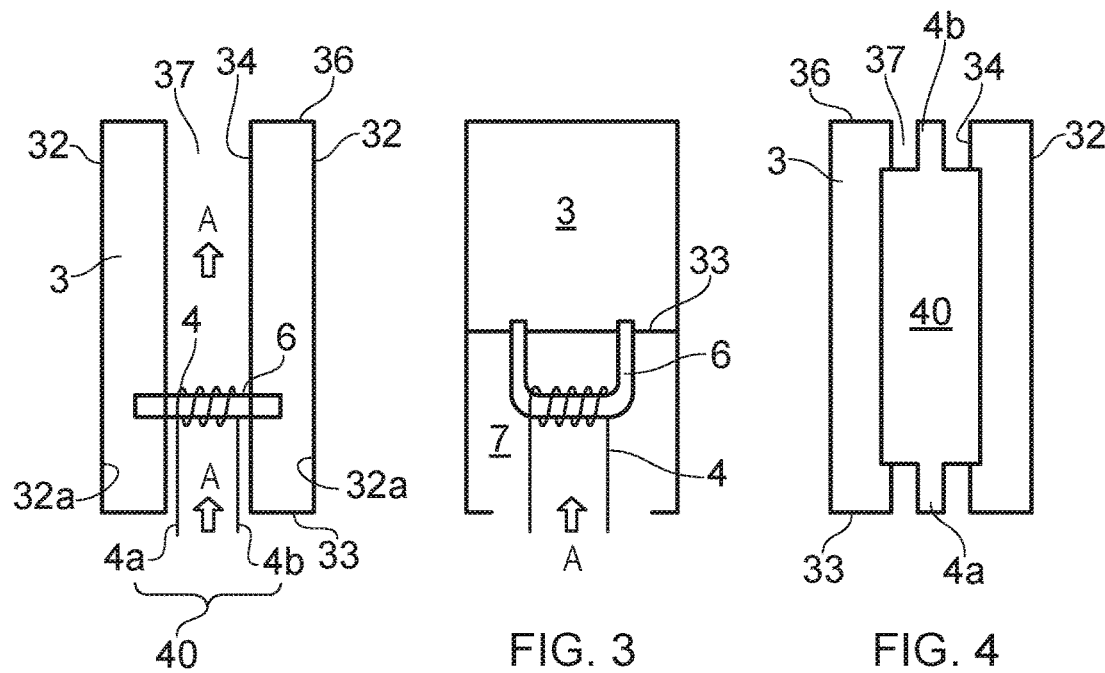
FIG. 2 shows a schematic cross-sectional view of a first example aerosol source of an electronic cigarette, comprising a reservoir and an atomizer.
FIG. 3 shows a schematic cross-sectional view of a second example aerosol source of an electronic cigarette, comprising a reservoir and an atomizer.
FIG. 4 shows a schematic cross-sectional view of a third example aerosol source of an electronic cigarette, comprising a reservoir and an atomizer.

The example device in FIG. 1 is presented in a highly schematic format. FIGS. 2 and 3 show more detailed representations of aerosol sources according to examples, indicating relative positions of a tank, a heater and a wick.

FIG. 2 shows a cross-sectional side view of an example aerosol source. A reservoir tank 3 has an outer wall 32 and an inner wall 34, each of which is generally cylindrical. The inner wall 34 is centrally disposed within the outer wall 32 to define an annular space between the two walls; this is the interior volume of the tank 3 intended to hold source liquid. The tank is closed at its lower end (in the orientation depicted) by a bottom wall 33 and at its top end by an upper wall 36. The central space encompassed by the inner wall 34 is a passage or channel 37 which at its lower end receives air drawn into the electronic cigarette (such as via air intakes 26 shown in FIG. 1), and at its upper end delivers aerosol for inhalation (such as through the mouthpiece 35 in FIG. 1). It also defines a chamber housing the atomizer.

Disposed within the airflow channel 37 is an atomizer 40 comprising a heater 4 and a wick 6. The wick, an elongate porous element that in this example is rod-shaped and may be formed from fibers, is arranged across the airflow passage (shown as closer to the lower end of the tank 3, but it may be positioned higher) so that its ends pass through apertures in the inner wall 34 and reach into the interior volume of the tank 3 to absorb source liquid therein. The heater 4 is an electrically powered heating element in the form of a wire coil wrapped around the wick 6. Connecting leads 4a, 4b join the heater to a circuit (not shown) for the provision of electrical power from a battery. The aerosol source will be disposed within the housing of a cartridge assembly section of an electronic cigarette, with a mouthpiece arranged at its top end and a controller and battery arranged at its lower end (possibly in a separable component). Note that the outer wall 32 of the tank 3 may or may not also be a wall of the cartridge assembly housing. If these walls are shared, the cartridge assembly may be intended to be disposable when the source liquid has been consumed, to be replaced by a new cartridge assembly connectable to an existing battery/power section, or may be configured so that the reservoir tank 3 can be refilled with source liquid. If the tank wall and the housing wall are different, the tank 3 or the whole aerosol source may be replaceable within the housing when the source liquid is consumed, or may be removable from the housing for the purpose of refilling. These are merely example arrangements and are not intended to be limiting.

In use, when the aerosol source within its assembly housing is joined to a battery section (separably or permanently depending on the e-cigarette design), and a user inhales through the mouthpiece, air drawn into the device through an inlet or inlets enters the airflow channel 37. The heater 4 is activated to produce heat; this causes source liquid brought to the heater 4 by the wick 6 to be heated to vaporization. The vapor is carried by the flowing air further along the airflow channel 37 to the mouthpiece of the device to be inhaled by the user. The arrows A indicate the airflow and its direction along the air flow path through the device.

FIG. 3 shows a cross-sectional side view of a further example aerosol source, in which the atomizer is positioned below a tank 3, which is not annular. The wick 6 has a u-shape, with its two ends positioned inside the tank 3 via apertures in a base wall 33 of the tank 3. As in FIG. 2, the heater 4 is a wire coil wrapped around a central portion of the wick. Air A can enter a chamber 7 below the tank housing the coil 4 and the wick 6 (an atomizer chamber), collect vaporized liquid as it flows over the heater, and then leaves the chamber 7 to travel along a further airflow path (not shown) to a mouthpiece of the device.

FIG. 4 shows a cross-sectional side view of an alternative example aerosol source. As in the FIG. 2 example, the tank 3 is an annular space formed between an outer wall 32 and an inner wall 34, with the interior space of the tubular inner wall 34 providing an airflow channel 37. In this example, however, the rod-shaped wick and coiled heating element are replaced by an atomizer 40 in which a single entity or element provides both the wicking and heating functions. An electrically conductive mesh can be used for this, for example, where the conductive characteristic allows the atomizer to receive electrical power and heat up, while the mesh structure allows a wicking action. The atomizer 40 is again arranged across the airflow channel 37 with parts passing through slots or other apertures in the inner wall 34 into the interior volume of the tank 3. The slots may be arranged as narrow openings to provide some capillary force to contribute to drawing liquid out of the reservoir, or may be sealed around the heating element 40 so that capillary action arises from the pores of the mesh of the heating element 40 only. In this example, the atomizer 40 has an elongate planar configuration and is arranged such that its long edges reach into the reservoir, and its short ends are at each end of the airflow passage 37. These ends 4a, 4b are connected to a battery by appropriate arrangement of electrical conductors (not shown). Thus, a larger area of vaporizing surface is offered to air flowing through the airflow channel.

In all these examples, the apertures through which the liquid leaves the reservoir to be conducted by the liquid conduit to the vapor generator may be sealed to some extent to minimize source liquid leakage from the tank 3 into the airflow channel 37 or atomizer chamber 7; nevertheless leakage may still arise, such as in the event of pressure inside the tank exceeding the external pressure. Also, FIGS. 2 to 4 are merely examples of aerosol sources to illustrate various alternatives available for achieving aerosol generation. Other configurations can achieve the same effect, and the disclosure is not limited in this regard. In particular, the reservoir may have other formats and the liquid coupling between the reservoir and the atomizer may differ. Whichever configuration is adopted, any design which includes a reservoir in the form of a tank, container, receptacle or similar volume for holding the source liquid will be potentially vulnerable to unwanted leakage of an excess of source liquid from the reservoir via the liquid transfer path leading to the atomizer. Liquid may begin its journey along the intended path for vaporization and arrive at or near the heater, but then not be vaporized. This may happen if, for example, the wicking action draws liquid towards the heater at a faster rate than it can be vaporized by the heater when activated, or if a pressure differential forces liquid out of the reservoir at a faster than intended rate, or when wicking continues when the heater is not activated. Liquid can then accumulate in or near the atomizer beyond the amount which can be held in the porous structure of the liquid conduit and/or the vaporizer (depending on construction), i.e. the liquid conduit and the vaporizer may become saturated, and the liquid may then be released as free liquid into the airflow channel, creating an unwanted escape or leak of liquid.

A potential technique to address unwanted leaks is to minimize leakage from the reservoir apertures, for example by including some form of seal. However, it is not desirable to provide a completely sealed reservoir, since it would be airtight or near-airtight and therefore restrict air from entering the reservoir. An ingress of air is necessary to equalize the pressure inside the reservoir as the source liquid is consumed, and to allow the continued outward flow of source liquid to the atomizer. Also, it is necessary to maintain the openings through which the liquid leaves the reservoir to reach the atomizer, and capillary action will continue to draw liquid to the atomizer if the heater is activated for vaporization or not.

Accordingly, an alternative approach is proposed to address loss of source liquid. It is proposed to arrange for capture or collection of any excess liquid in a manner that allows it to be consumed at a later time. Use of a liquid buffer element comprising an absorbent material is proposed.

A liquid buffer is formed from an absorbent material, which is able to absorb incident source liquid under certain conditions. The liquid buffer is arranged within an electronic cigarette or a component of an electronic cigarette which houses an atomizer in such a way that it is in liquid transfer contact with the liquid conduit (liquid transfer path) carrying liquid from the reservoir to the vapor generator. The contact between the buffer and the conduit is positioned at a part of the conduit that lies between a part or parts of the conduit that receive liquid from the reservoir (for example, end parts of the wicks of the FIGS. 2 and 3 examples that lie inside the reservoir) and the location where the conduit meets the vapor generator (for example, the heating coil in the FIGS. 2 and 3 examples). Hence, the buffer element contacts the conduit along the path taken by liquid moving from the reservoir to the vaporizer. By "liquid transfer contact" it is meant that the liquid buffer and the liquid conduit are placed in sufficient proximity that liquid can transfer one from the other; this may or may not include actual physical contact or touching.

The liquid buffer or liquid buffer element provides a buffering function between the liquid conduit and other regions within and outside the electronic cigarette, to address leakage. Leaked liquid is thereby captured by the buffer, and moreover can be stored therein for later consumption; accordingly this part may be considered as a liquid capture element, or liquid storage element. These various terms may be used interchangeably herein.

The absorbent material(s) from which the liquid buffer is formed are chosen with particular regard to the absorbent property. It is desired that under normal conditions, namely when the amount of liquid held in the liquid conduit is below a saturation threshold and so does not produce a leak of free liquid, the buffer does not absorb significant amounts of liquid from the conduit. In other words, liquid is drawn along the conduit directly from reservoir to vaporizer without being drawn into the liquid buffer, despite the liquid transfer contact between the buffer and the conduit.

However, an overpressure situation in the reservoir may result in more liquid being forced into the conduit than the capillary force and surface tension it offers can hold. The conduit thus becomes saturated, and excess liquid may present as free liquid at a surface of the conduit. The buffer element is in place to absorb this free liquid, and prevent it from escaping to elsewhere within or outside the electronic cigarette.

This is achieved by forming the liquid buffer from an absorbent structure that provides a lower capillary force than the capillary force offered by the liquid conduit (be it a porous wick, or a capillary channel, slot or tube). Under normal conditions, the higher capillary force of the conduit will maintain fluid within the conduit in preference to the buffer. If the conduit becomes saturated, free liquid is then able to escape the capillary force of the conduit, but may then be taken up by the capillary force of the buffer instead. The liberated liquid is hence held in the buffer.

If the leak failure mode is subsequently rectified, such as by the pressures in the tank and the surrounding environment equalizing, the conduit can return to its proper operation and hold the amount of liquid governed by its capillary force and surface tension. A steady state is resumed, and liquid is delivered to the vapor generator at an appropriate rate. For as long as there is liquid remaining in the tank, the conduit will advantageously absorb liquid from the tank as compared to the buffer, because the buffer material has a higher capillary force than the tank (which in the case of a free liquid reservoir offers in effect a zero capillary force). Hence, liquid is properly delivered for vaporization, and the buffer continues to store any liquid it collected during the leakage episode.

When the reservoir becomes empty and can no longer feed any liquid to the conduit, the conduit is then able to reabsorb liquid from the buffer, and deliver this to the vapor generator. Hence, liquid which would otherwise have been lost during the leakage episode is able to be consumed. At least some of any liquid stored in the buffer will be able to be regained in this way. Thus, not only is lost liquid prevented from damaging or escaping from the electronic cigarette, it is also retained for future consumption, thereby reducing waste. The buffer acts as part of the overall liquid accommodation in the electronic cigarette; it is a supplement to and separate from the reservoir.

As noted above, the buffer is made from an absorbent structure which provides a lower capillary force to the source liquid than the capillary force of the conduit that delivers the source liquid from the reservoir to the vapor generator. Hence, the absorbent structure is implemented with reference to the nature and properties of the conduit. These will include the width of slots, channels, tubes and pipes in the case of a conduit having the form of openings within the electronic cigarette structure. For a conduit formed from a porous material, such as wick formed from fibers (cotton fibers or glass fibers for example) or a porous ceramic, the pore size and density are relevant. Hence, the buffer may comprise an absorbent material having a lower density than the conduit, and/or a higher porosity (ratio of pore/void volume to total volume) than the conduit. The size (width or diameter) of the pores is also of interest since this will also affect the capillary force offered by a material. Using these characteristics to select an absorbent buffer structure with a lower capillary force than the conduit means that under normal operation (when the conduit is not saturated) the capillary forces offered by the buffer and the conduit will favor capillary movement of liquid from the tank to the vaporizer as the liquid is drawn into the smaller capillary spaces. There is insufficient capillary force within the absorbent buffer structure to draw liquid out of the conduit, so the buffer does not absorb significant amounts of liquid under normal circumstances.

The buffer may be formed from a dedicated absorbent material. Examples of materials which are suitable for use as a liquid buffer include natural sponge, synthetic sponge, porous ceramic, cotton wadding, glass fiber wadding, wool, porous plastics materials, structure made from or comprising porous polymer fibers, and structures made from non-woven fibers. Such materials have a porosity and density that provide capillary force, which can be compared to that of the conduit and selected to be lower.

Alternatively, the liquid buffer may comprise a capillary structure offering an appropriate level of capillary force, where the capillary structure or network is one or more connected or unconnected slots, channels, tubes, openings and similar in, for example, a part of the electronic cigarette such as a side wall, or other rigid/solid component, rather than being formed from a separate piece of absorbent material. So, in an example, both the conduit and the buffer may comprise one or more capillary channels, where the conduit channels are narrower than the buffer channels to provide the required higher capillary force.

Hence, the liquid buffer may be thought of as an absorbent structure, where the absorbency may be provided by a dedicated absorbent material or by capillary holes in a suitable component. Unless indicated by the context, the terms "absorbent material" and "absorbent structure" may be used interchangeably in the present disclosure.

In summary, either or both of the conduit and the buffer may comprise a capillary network of capillary channel(s) in a solid component of the electronic cigarette, or a dedicated absorbent material. All combinations of these options are viable.

To achieve the required absorbent operation, the liquid conduit may have an average or characteristic capillary pore size that is smaller than an average or characteristic capillary pore size of the absorbent structure or material from which the liquid buffer is formed. As an example, a largest capillary pore size of the liquid conduit may be smaller than the smallest capillary pore size of the absorbent structure.

One may also consider the buffer in terms of its relative hydrophilia or hydrophobia (or corresponding terms for a non-water-based source liquid). The buffer can comprise an absorbent material or structure which is more hydrophobic or less hydrophilic than the liquid conduit. Conversely, the liquid conduit may be more hydrophilic or less hydrophobic than the buffer element. Consequently, the liquid conduit will have a greater effectiveness to absorb source liquid than the buffer, and therefore the source liquid will be advantageously conducted along the conduit and not divert into the buffer unless the conduit is at its maximum capacity and unable to accommodate any more liquid.

Usefully, the capillary force provided by the conduit may be in the range of 2 to 10 times the capillary force provided by the liquid buffer. For example, the conduit capillary force may be 2 or 3 or 4 or 5 or 6 or 7 or 8 or 9 or 10 times greater than the liquid buffer's capillary force. Larger multiples may also be used, so that the conduit has a capillary force more than 10 times the capillary force of the liquid buffer. Also, smaller values might be used, so that the conduit has a capillary force between 1 and 2 times that of the liquid buffer, such as 1.1, 1.2, 1.3, 1.4, 1.5, 1.6, 1.7, 1.8 or 1.0 times. These are example only, however, and other relative values of capillary force that offer a higher capillary force in the liquid conduit than in the liquid capture element are not precluded.

As noted above, the liquid buffer is arranged with respect to the conduit to allow the transfer of liquid between the two components, for example they are in or near physical contact. The region (portion) or regions where transfer can occur lies between the outlet of the reservoir that feeds liquid to the conduit, and the vaporizer. In addition, it is useful if the buffer is located in a region of the electronic cigarette which is freely connected to the ambient environment (surrounding air). This allows the escape of air displaced from the buffer when it absorbs liquid, so that absorption can be efficient. The absorption offered by a buffer in an air-tight chamber will be less effective.

Figure 5:
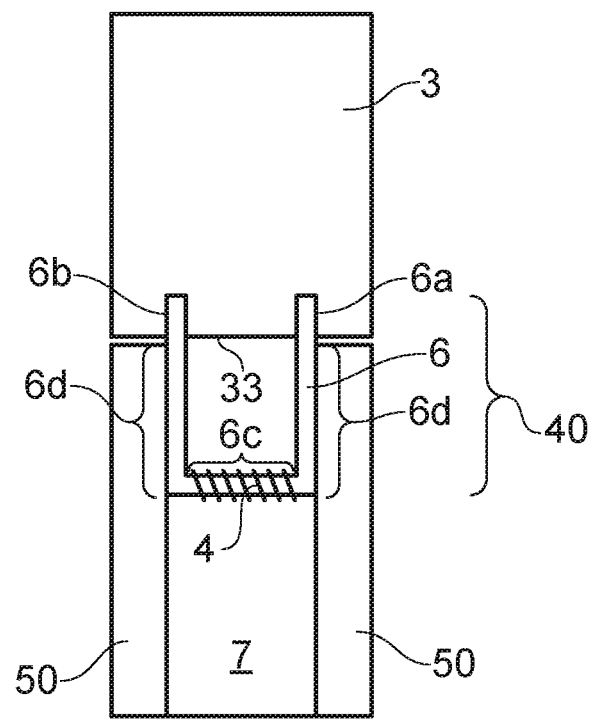
FIG. 5 shows a schematic longitudinal cross-sectional view of an example aerosol source incorporating a liquid buffer.

FIG. 5 shows a longitudinal cross-section of part of an example electronic cigarette incorporating a buffer. The Figure is highly schematic, and outer parts of the electronic cigarette, and the airflow path through the electronic cigarette are not shown. A tank or reservoir 3 for holding source liquid is shown; this provides a supply of liquid for an atomizer 40 comprising a porous wick 6 and a heating coil 4 wrapped around the wick 6. The atomizer is positioned below the tank 3 in the depicted orientation. The wick 6 has a u-shape, with first and second ends 6a, 6b passing through apertures in the base 33 of the tank 3 to receive liquid from the reservoir interior. The heating coil 4 is wound around a central portion 6c of the wick 6 which lies in a chamber 7 below the tank 3.

A buffer 50 forms, in this example, side walls of the chamber 7. Also, the buffer 50 is in contact with portions 6d of the wick 6 which lie between its ends 6a, 6b and its central portion 6c, in other words, between the tank outlets and the heater 4. The portions 6d maintain contact with the buffer 50 over an extended distance, and this contact provides the required liquid transfer capability for the buffer to absorb liquid from the wick should the latter become saturated. Note that close physical contact may be provided, or there may be gap between the wick 6 and the buffer 50 providing that any accumulated liquid is able to bridge the gap and enter the buffer 50 before dripping from the wick 6. Liquid transfer contact may or may not be actual physical contact, therefore.

Figure 6:
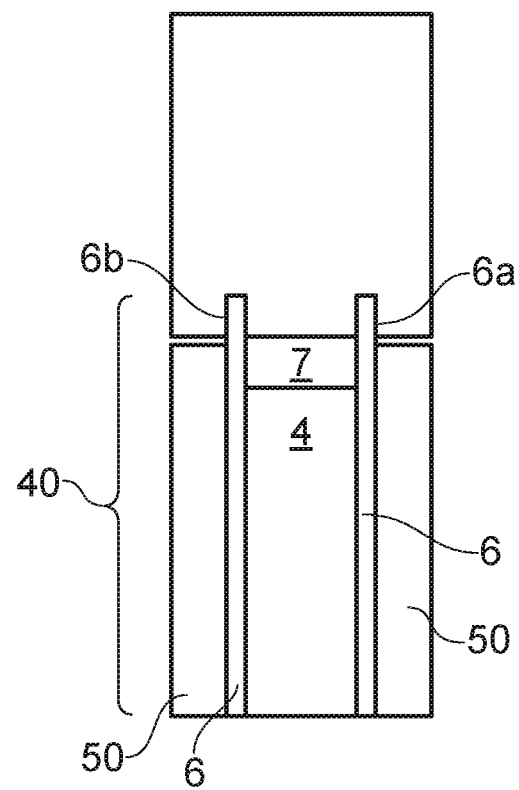
FIG. 6 shows a schematic longitudinal cross-sectional view of a further example aerosol source incorporating a liquid buffer.

FIG. 6 shows a schematic longitudinal cross-section of part of a further example electronic cigarette incorporating a buffer. In this example, the atomizer 40 is again below the tank 3, and comprises a planar heater made from a conductive mesh that extends across the atomizer chamber 7 so that its two long edges communicate with a pair of conduits 6 that deliver liquid from the tank 3. The conduits 6 may be rods or strings of a porous material, or may be capillary channels (tubes or slots, for example). An end 6a, 6b of each conduit receives liquid from inside the tank 3. More than two conduits may be used.

A buffer 50 is in liquid transfer contact with each conduit 6, on an opposite side of the conduit to that which communicates with the mesh heater 4. The buffer 50 extends the full length of the conduits 6 which lie outside the tank 3, although this is not essential. This extended contact increases the ability of the buffer to collect all excess liquid from saturated conduits, however, to reduce the risk of leakage from the electronic cigarette. In an example where the conduits and the buffer comprise porous materials, the conduit material may have a higher density than the buffer material, and/or the conduit material may have a lower porosity than the buffer material, as ways to provide the required higher capillary force for the conduits than for the buffer.

Arrangement and positioning of the liquid buffer is not limited to these examples, and will depend in part on the configuration of the atomizer and the type and nature of the conduit employed to feed the vapor generator. A large volume buffer will be able to accommodate an increased amount of source liquid so can manage a larger number of, or longer, leakage episodes. However, a balance will likely be required between a desirable large buffer capacity, and the available space inside the electronic cigarette or a particular desired overall size for the electronic cigarette. A buffer made from a material with a higher absorbency will be able to store more liquid, but the absorbency should not compromise the requirement for a lower capillary force for the buffer compared to the conduit.

A technique to efficiently fit the buffer into the electronic cigarette is to employ an existing component of the electronic cigarette as the buffer, by making that component from a suitable absorbent material or forming it to have an absorbent structure. For example, part or all of the wall or walls that define the atomizer chamber (that is, the space in which the atomizer is located and wherein air flows over the vapor generator to form the required aerosol for delivery to the user) can be used as the buffer.

Figure 7:
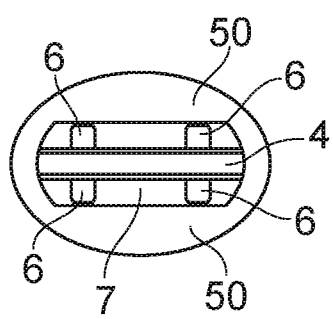
FIG. 7 shows a schematic transverse cross-sectional view of an example aerosol source incorporating a liquid buffer.

FIG. 7 shows a transverse cross-section through an example atomizer chamber formed in this way. The chamber 7 houses the heater 4, which in this example is a mesh heater as in FIG. 6. Four conduits 6 deliver liquid to the heater 4 from a tank (not shown); each conduit 6 has one side in communication with the heater 4 to enable liquid to transfer to the mesh structure of the heater 4 for heating and vaporization. The chamber 7 is surrounded by an outer wall formed by the buffer 50. To achieve this, the buffer 50 may be made from an absorbent material which is sufficiently rigid to be self-supporting (porous ceramic, or a stiff foam or sponge, for example). Alternatively, a more conventional wall material, such as a rigid plastic, may be provided with capillary holes or channels by molding or machining or other shaping processes to form an absorbent structure. The walls are shaped such that they are close enough to the sides of the conduits 6 opposite to the heater 4 to provide the required liquid transfer contact. The sides of the heater 4 may be supported by mounting onto the walls. The walls may be formed in two parts which are joined together to create the chamber 7, as in the FIG. 7 example, or may be made of more or fewer parts. Joins between the parts may provide mounting for the heater.

Wholly or partly surrounding the atomizer chamber with the buffer in this way provides a large buffer volume with little requirement to increase the overall size of the electronic cigarette. A similar arrangement may be achieved for a non-rigid buffer material, such as a soft foam or sponge, or a wadding. A cage, frame or similar supporting structure can be placed around the atomizer, and the buffer material wrapped around the cage.

Figure 8:
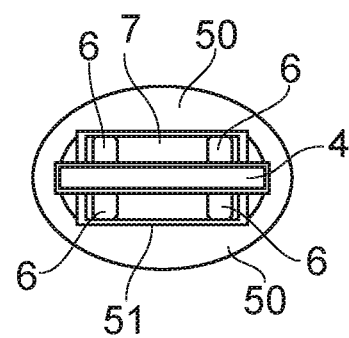
FIG. 8 shows a schematic transverse cross-sectional view of another example aerosol source incorporating a liquid buffer.

FIG. 8 shows a transverse cross-section through an example atomizer chamber formed in this way. The chamber 7 accommodates a mesh heater 4 and four conduits 6 as before. In this example, though, a cage 51, formed for example of wire (perhaps coated) or molded from plastic, defines the outer perimeter of the chamber 7, and supports the heater 4 and/or the conduits 6 (which may also provide some support to each other). A layer of buffer material 50 is wrapped around the cage 51, and may be secured in place by adhesive or tying, for example, or may be formed as a tube of material into which the cage 51 and the atomizer is inserted. The cage is formed from struts which are sufficiently thin and/or sufficiently widely spaced to allow close enough contact between the buffer material and the conduits for the required liquid transfer contact.

Use of the buffer to form at least part of the atomizer chamber wall is further beneficial in that the buffer is in a position in which it is able to absorb stray source liquid arising from other failure modes, such as spitting of unvaporized liquid from the heater, and condensation of vaporized liquid that has not been successfully taken up in the aerosol stream.

The liquid buffer may be formed from one or more pieces, for example one piece in contact with one or more conduits or parts of a conduit or conduits, or separate pieces each in contact with a different conduit or conduit part. If more than one piece is used, the pieces may be made from different absorbent materials or the same absorbent material.

Some examples discussed above have included more than one conduit (e.g. multiple wicks or capillary channels in a single atomizer). However, in general, herein the term "conduit" should be understood to include both one conduit and more than one conduit. In other words, it covers both the singular and the plural.

The liquid buffer may be included as part of an atomizer assembly intended for incorporation (replaceable or permanent) into a cartomizer or cartridge component for detachable coupling to a battery section to form an electronic cigarette or other vapor provision device (electronic or non-electronic), or may be included directly into such a cartomizer or cartridge component, or may be included directly into an electronic cigarette or other vapor provision device (electronic or non-electronic) that does not comprise detachable or separable components.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An assembly for a vapor provision device comprising:

a vapor generator for vaporizing source liquid;

a liquid conduit for delivering the source liquid from a reservoir to the vapor generator; and a liquid capture element in liquid transfer contact with at least a portion of the liquid conduit between the vapor generator and a part of the liquid conduit that receives liquid from the reservoir, and comprising an absorbent structure providing a lower capillary force than a capillary force of the liquid conduit.

2. The assembly according to claim 1, wherein an average capillary pore size of the liquid conduit is smaller than an average capillary pore size of the absorbent structure.

3. The assembly according to claim 1, wherein the liquid conduit comprises a wicking element formed from a porous material.

4. The assembly according to claim 3, wherein the absorbent structure has a lower density than the porous material.

5. The assembly according to claim 3, wherein the absorbent structure has a higher porosity than the porous material.

6. The assembly according to claim 1, wherein liquid conduit comprises at least one capillary channel.

7. The assembly according to claim 6, wherein the capillary channel comprises one or more tubes.

8. The assembly according to claim 6, wherein the capillary channel comprises one or more slots in a wall of the assembly.

9. The assembly according to claim 1, wherein the absorbent structure is provided by an absorbent material.

10. The assembly according to claim 9, wherein the absorbent material is one or more of natural sponge, synthetic sponge, porous ceramic, cotton wadding, glass fiber wadding, wool, porous plastics, porous polymer fibers, or non-woven fibers.

11. The assembly according to claim 1, wherein the absorbent structure is provided by one or more capillary channels formed in a solid material.

12. The assembly according to claim 1, wherein the vapor generator comprises a heating element.

13. The assembly according to claim 12, wherein the heating element comprises one or more electrically resistive wires disposed around or within the liquid conduit.

14. The assembly according to claim 12, wherein the heating element comprises an electrically resistive mesh.

15. The assembly according to claim 1, wherein the liquid capture element at least partially surrounds the vapor generator and the liquid conduit.

16. The assembly according to claim 15, wherein a wall or walls of a chamber housing the vapor generator and the liquid conduit are formed from the absorbent structure.

17. The assembly according to claim 15, wherein the vapor generator and the liquid conduit are arranged in a support structure on which the liquid capture element is supported.

18. A cartridge assembly for a vapor provision device comprising the assembly according to claim 1 and the reservoir for holding the source liquid.

19. A vapor provision device comprising the assembly according to claim 1.

20. An atomizer assembly for an electronic vapor provision device comprising:

a vaporizer for vaporizing source liquid;

a liquid delivery mechanism for delivering the source liquid from a reservoir to the vaporizer; and an absorbent buffer element contacting the liquid delivery mechanism between an outlet of the reservoir and the vaporizer and being less hydrophilic to the source liquid than the liquid delivery mechanism.

21. A method for capturing source liquid that has leaked from a reservoir in a vapor provision device, the method comprising:

arranging a liquid capture element in liquid transfer contact with at least a portion of a liquid conduit configured to deliver source liquid from a reservoir to a vapor generator, the at least a portion of the liquid conduit lying between the vapor generator and a part of the liquid conduit that receives liquid from the reservoir, wherein the liquid capture element comprises an absorbent structure providing a lower capillary force than a capillary force of the liquid conduit.

* * * * *